(12) United States Patent
Mital et al.

(10) Patent No.: US 8,359,572 B2
(45) Date of Patent: Jan. 22, 2013

(54) SELF-DESCRIBING RE-USABLE SOFTWARE COMPONENTS

(75) Inventors: Vijay Mital, Kirkland, WA (US); Suraj T. Poozhiyil, Seattle, WA (US); Michael J. McCormack, Snohomish, WA (US); Gregory S. Lindhorst, Seattle, WA (US); Andrew Robert Miller, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 11/971,200

(22) Filed: Jan. 8, 2008

(65) Prior Publication Data

US 2009/0178026 A1    Jul. 9, 2009

(51) Int. Cl.
*G06F 9/44* (2006.01)

(52) U.S. Cl. ........ 717/120; 717/105; 717/107; 717/108; 717/162

(58) Field of Classification Search .................. None
See application file for complete search history.

(56) References Cited

U.S. PATENT DOCUMENTS

| | | | |
|---|---|---|---|
| 6,256,773 B1 * | 7/2001 | Bowman-Amuah | 717/121 |
| 6,405,364 B1 * | 6/2002 | Bowman-Amuah | 717/120 |
| 6,442,748 B1 * | 8/2002 | Bowman-Amuah | 717/108 |
| 6,550,057 B1 * | 4/2003 | Bowman-Amuah | 717/108 |
| 6,601,233 B1 * | 7/2003 | Underwood | 717/107 |
| 6,601,234 B1 * | 7/2003 | Bowman-Amuah | 717/108 |
| 6,662,357 B1 * | 12/2003 | Bowman-Amuah | 717/120 |
| 7,073,170 B2 * | 7/2006 | Grier et al. | 717/162 |
| 7,096,457 B2 | 8/2006 | Litoiu et al. | |
| 7,194,682 B2 | 3/2007 | Warrington | |
| 7,730,182 B2 * | 6/2010 | Mital et al. | 709/226 |
| 2003/0005412 A1 | 1/2003 | Eanes | |
| 2003/0046665 A1 | 3/2003 | Ilin | |
| 2003/0056205 A1 * | 3/2003 | Miloushev et al. | 717/162 |
| 2006/0005163 A1 | 1/2006 | Huesken et al. | |
| 2006/0101442 A1 * | 5/2006 | Baumgart et al. | 717/162 |
| 2006/0161563 A1 * | 7/2006 | Besbris et al. | 707/100 |
| 2006/0230382 A1 * | 10/2006 | Moulckers | 717/120 |
| 2006/0230396 A1 | 10/2006 | Martinez et al. | |
| 2007/0094638 A1 * | 4/2007 | DeAngelis et al. | 717/107 |
| 2007/0226684 A1 * | 9/2007 | Boske et al. | 717/108 |
| 2007/0234291 A1 * | 10/2007 | Ronen et al. | 717/120 |
| 2007/0234335 A1 * | 10/2007 | Takahashi et al. | 717/168 |
| 2008/0127052 A1 * | 5/2008 | Rostoker | 717/105 |
| 2008/0127081 A1 * | 5/2008 | Schumann | 717/120 |
| 2008/0163166 A1 * | 7/2008 | Raman | 717/107 |
| 2008/0256514 A1 * | 10/2008 | Shiflet | 717/120 |

OTHER PUBLICATIONS

Charles W. Krueger, Software Reuse, ACM Computing Surveys vol. 24 Issue 2, Jun. 1992, [Retrieved on Sep. 19, 2012]. Retrieved from the internet: <URL: http://dl.acm.org/citation.cfm?id=130856> 53 Pages (131-183).*

(Continued)

*Primary Examiner* — Don Wong
*Assistant Examiner* — Anibal Rivera
(74) *Attorney, Agent, or Firm* — Hope Baldauff Hartman, LLC (57) ABSTRACT

Technologies are presented herein for self-describing re-usable software components. Metadata is generated and published with a re-usable software component that identifies the capabilities of the software component, identifies other software components that the re-usable software component may be integrated with, and identifies mechanisms for integrating the re-usable software component with other software components. The metadata can then be used to discover re-usable software components and to integrate the re-usable software components with other software components.

19 Claims, 5 Drawing Sheets

OTHER PUBLICATIONS

Jyrki Kontio et al., Defining Factors, Goals and Criteria for Reusable Component Evaluation, Nov. 1996, [Retrieved on Sep. 19, 2012]. Retrieved from the internet: <URL: http://dl.acm.org/citation.cfm?id=782073> 12 Pages (1-12).*

Gianluigi Caldiera et al., Identifying and Qualifying Reusable Software Components, vol. 24 Issue 2, IEEE Feb. 1991, [Retrieved on Sep. 19, 2012]. Retrieved from the internet: <URL: http://ieeexplore.ieee.org/xpls/abs_all.jsp?arnumber=67210&tag=1> 10 Pages (61-70).*

Wolpert, "Designing Composite Applications: Component Design", Oct. 2, 2007, pp. 1-12.

Ramachandran, "Automated Improvement for Component Reuse", pp. 8.

Fayad, et al.,"Object-Oriented Application Frameworks", Special Issue on Object-Oriented Application Frameworks, vol. 40, No. 10, Oct. 1997, pp. 9.

U.S. Appl. No. 11/567,630, filed Dec. 6, 2006 Inventor(s) Mital et al., entitled "Processing Data-Centric Business Models".

U.S. Appl. No. 11/670,815, filed Feb. 2, 2007 Inventor(s) Mital et al., entitled "User-Interface Architecture for Manipulating Business Models".

Ramachandran, "Automated Improvement for Component Reuse", May 2005, INFOCOMP Journal of Computer Science, 4(1):1-8.

* cited by examiner

SELF-DESCRIBING RE-USABLE SOFTWARE COMPONENTS

BACKGROUND

Software developers frequently build software components for others to reuse within their applications. For instance, software developers may create widgets, objects, world-wide-web ("Web") parts, Web services, models, workflows, and various other types of software components for others to reuse. This provides a great deal of efficiency for a user of a re-usable software component (hereinafter "a re-user") in that the re-user does not have to create the functionality provided by the re-usable software component.

In order to utilize a re-usable software component, a re-user needs to understand the capabilities that a re-usable software component provides. The re-user also needs to understand how to integrate the re-usable software component with other software components the re-user is already using. While a re-user that is a skilled programmer may be able to easily perform these tasks, re-users that are non-programmers may find it extremely difficult to understand and integrate re-usable software components with other software components in an appropriate fashion.

It is with respect to these considerations and others that the disclosure made herein is presented.

SUMMARY

Technologies are presented herein for providing, discovering, and integrating self-describing re-usable software components. In particular, through the implementations and embodiments presented herein, knowledge is provided at the time a re-usable software component is published that enables re-users to more easily understand the capabilities that a re-usable software component provides and how the re-usable software component connects to other software components. The published knowledge may also be utilized to discover an appropriate re-usable software component for a particular application and to integrate the re-usable software component with other compatible software components in a simplified manner.

According to one aspect presented herein, metadata is generated and published with a re-usable software component that identifies the capabilities of the software component, identifies other software components that the re-usable software component may be integrated with, and identifies mechanisms for integrating the re-usable software component with other software components. The metadata can then be used to discover re-usable software components and to integrate the re-usable software components with other software components. Integration may be performed in a completely automated fashion using the metadata. Alternatively, the metadata may be utilized to solicit a re-user for options regarding how the integration is to be performed. The integration may then be performed using the integration options specified by the re-user.

According to other aspects, the metadata published with a re-usable software component specifies one or more transformations for integrating the re-usable software component with other software components. The metadata may also indicate whether the mechanisms for integrating the re-usable software component with other software components are limited to use, or scoped for use, with any particular other software components. The metadata may further indicate whether the mechanisms for integrating the re-usable software component with other software components are scoped to any of the capabilities of the re-usable software component.

According to other aspects, a mechanism is also provided by which a re-user of the re-usable software component may publish additional metadata for use with the re-usable software component. The additional metadata may provide a popularity value indicating the popularity of the re-usable software component. The additional metadata may also provide an indication as to whether the mechanisms specified for integrating the re-usable software component with other software components were useful for an actual integration between the re-usable software component and another software component. The re-user may also be permitted to append additional metadata to the original metadata published with the re-usable software component.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following disclosure is directed to technologies for providing, discovering, and integrating self-describing re-usable software components. Through the use of the technologies and concepts presented herein, metadata is published with a re-usable software component that describes the capabilities, affinities, and integration mechanisms for the re-usable software component. Through the use of this metadata, the re-usable software component can be discovered and integrated with other software components in a fully or semi-automated manner.

In the following detailed description, references are made to the accompanying drawings that form a part hereof, and which are shown by way of illustration specific embodiments or examples. Referring now to the drawings, in which like numerals represent like elements throughout the figures, several embodiments and implementations for implementing and utilizing self-describing re-usable software components will be presented.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
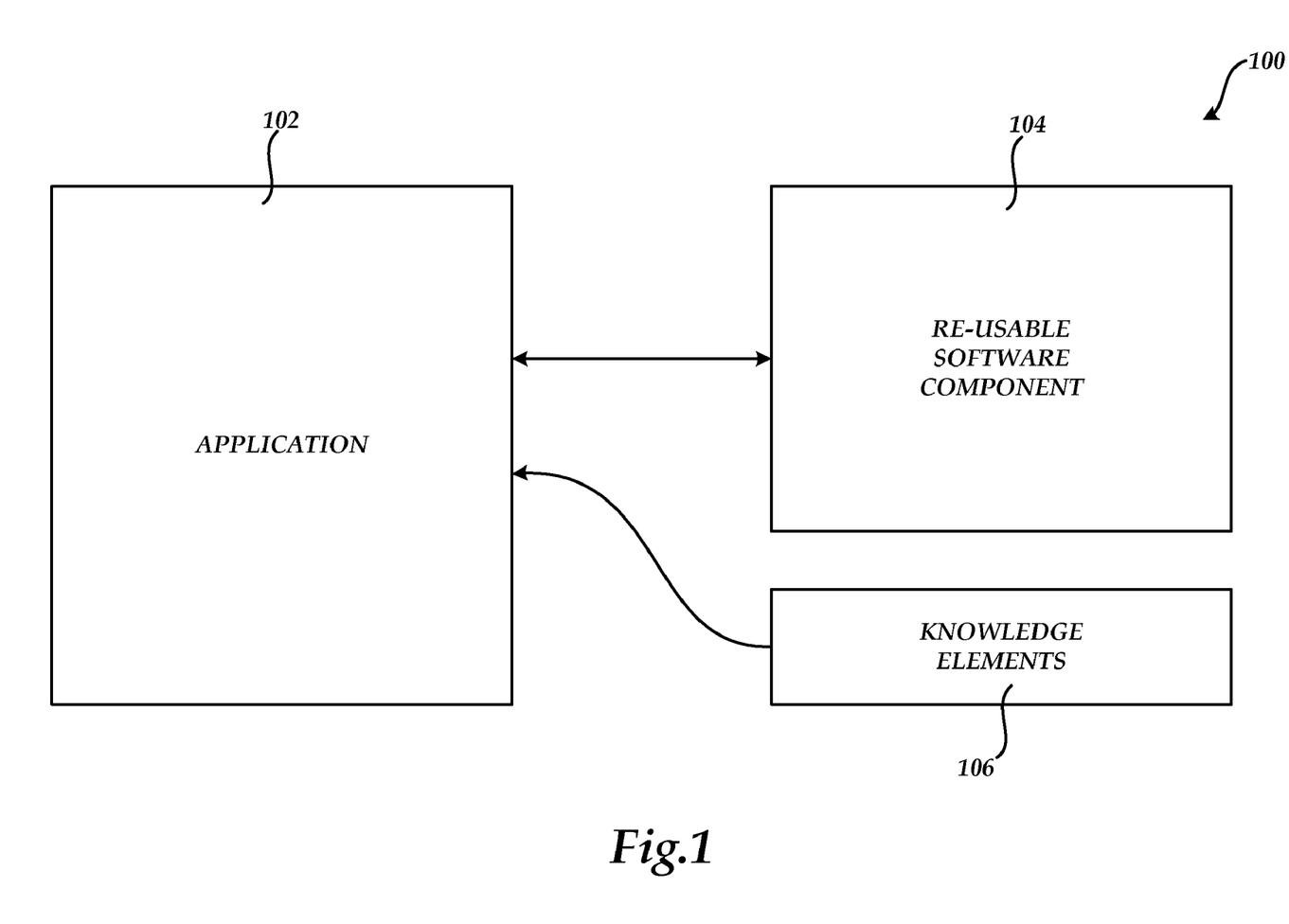
FIG. 1 is a software architecture diagram showing aspects of a re-usable software component disclosed in embodiments presented herein.

Turning now to FIG. 1, details will be provided regarding an illustrative operating environment and several software components presented herein. In particular, FIG. 1 shows aspects of a software architecture 100 for providing, discovering, and integrating a re-usable software component 104. As used herein, the term "software component" refers to any type of executable or non-executable software component. By example and not limitation, the re-usable software component 104 may comprise a widget, object, Web part, Web service, data model, workflow, application, plug-in, program fragment, or template. In one particular implementation, the re-usable software component 104 comprises a transformable textually describable data model that is represented using extensible markup language ("XML") or another markup language.

The re-usable software component 104 illustrated in FIG. 1 is published in a manner that allows the re-usable software component 104 to be easily discovered and integrated with another software component, such as the application 102. The application 102 is configured for execution on a standard desktop, laptop, or server computer (not illustrated in FIG. 1). In order to permit the application 102 to discover and integrate the re-usable software component 104, knowledge elements 106 are published for use with the re-usable software component 104.

The knowledge elements 106 comprise data that identifies the capabilities and affinities of the re-usable software component 104 along with one or more mechanisms for integrating the re-usable software component 104 with other software components. The knowledge elements 106 may be specified at any time prior to publication or at the time of publication of the re-usable software component 104. As used herein, the term "publication" refers to the process of making the re-usable software component 104 available to re-users. The re-usable software component 104 is "self-describing" in that the data set forth by the knowledge elements 106 specifies the capabilities, affinities, and integration mechanisms for the re-usable software component 104.

According to various embodiments, the knowledge elements 106 comprise data that is formatted using XML, another markup language, or another data format altogether, that identifies the capabilities of the re-usable software component 104. According to embodiments, the knowledge elements 106 also identify one or more other software components with which the re-usable software component 104 may be integrated. In this way, the knowledge elements 106 indicate the "affinities" of the re-usable software component 104.

The capabilities identified by the knowledge elements 106 may be scoped to one or more of the other software components that the re-usable software component 104 may be integrated with.

According to other embodiments, the knowledge elements 106 also contain data that identifies one or more mechanisms for integrating the re-usable software component 104 with other software components. The mechanisms for integrating the re-usable software component 104 may be scoped for use with a particular other software component or set of other software components. The mechanisms for integrating the re-usable software component 104 may also be scoped to one or more of the capabilities of the re-usable software component 104 identified by the knowledge elements 106.

In one embodiment where the re-usable software component 104 comprises a transformable textually describable model, the mechanisms identified by the knowledge elements 106 for integrating the re-usable software component 104 with other software components may include one or more data transformations to be performed in order to integrate the re-usable software component 104. In this way, the knowledge elements 106 can specify how the re-usable software component 104 is to be transformed to allow it to integrate with other software components, like the application 102. For instance, the knowledge elements 106 may specify a merge operation or a union operation that is to be performed between the re-usable software component 104 and another software component to integrate the two components.

As will be discussed in greater detail below, the knowledge elements 106 may be searched to discover an appropriate re-usable software component 104 for use in a particular application. In this regard, it should be appreciated that although only a single re-usable software component 104 has been illustrated in FIG. 1, many re-usable software components 104 and their corresponding knowledge elements 106 may be published in a library, database, or in another manner, and made available for consumption by re-users. Once an appropriate re-usable software component 104 has been discovered, the knowledge elements 106 are also utilized to integrate the re-usable software component 104 in a fully- or semi-automated fashion. Additional details regarding publication of the knowledge elements 106, and the discovery and integration of a re-usable software component 104 are provided below.

Although FIG. 1 illustrates the integration of an application 102 with the re-usable software component 104, it should be appreciated that the embodiments presented herein permit the integration of any type of software component with a re-usable software component 104. It should also be appreciated that although the knowledge elements 106 are illustrated in FIG. 1 as being located external to the re-usable software component 104, the knowledge elements 106 may also be stored within the re-usable software component 104 itself. The knowledge elements 106 may also be stored separately as shown in FIG. 1 and made available through a database or other mechanism. When stored separately, the knowledge elements 106 may contain a reference to the corresponding re-usable software component 104.

Figure 2:
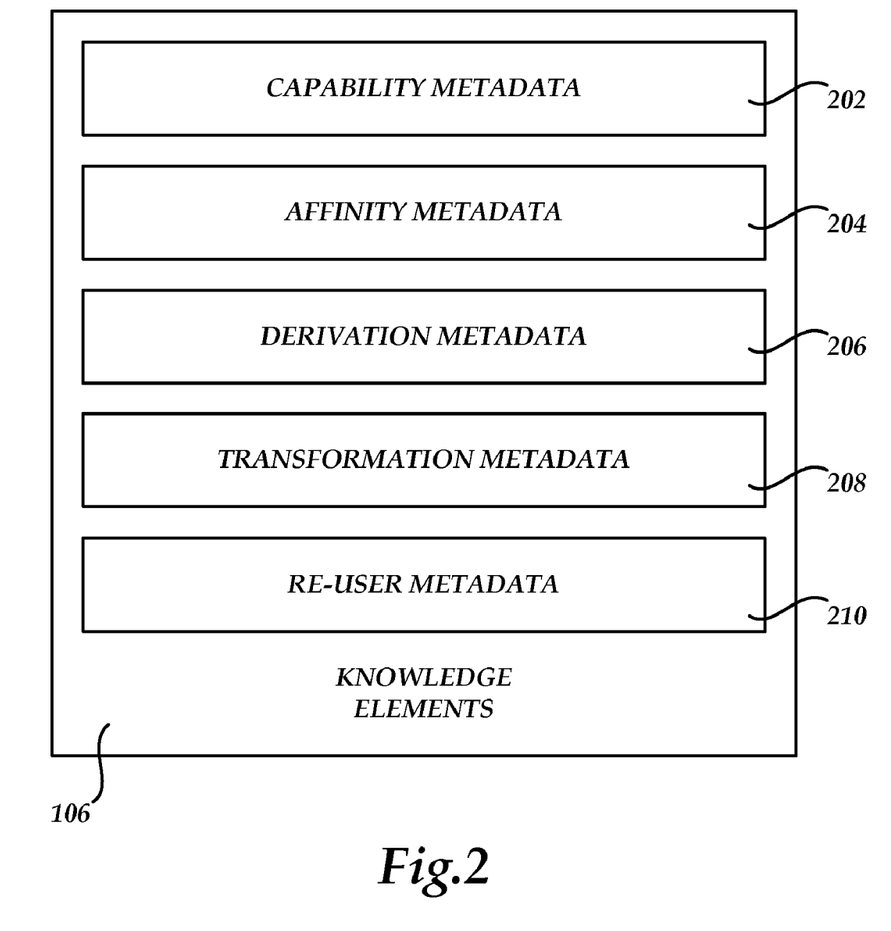
FIG. 2 is a data structure diagram illustrating aspects of a knowledge element data structure utilized in embodiments presented herein.

Referring now to FIG. 2, additional details will be provided regarding the form and contents of the knowledge elements 106 in one implementation. As discussed above with reference to FIG. 1, the knowledge elements 106 comprise data that identifies the capabilities and affinities of the re-usable software component 104 along with the mechanisms for integrating the re-usable software component 104 with other software components. The knowledge elements 106 may be specified using XML, another markup language, or another data model altogether.

In one implementation, the capabilities of the re-usable software component 104 are specified using capability metadata 202. The capability metadata 202 specifies the capabilities of the re-usable software component. The capability metadata 202 may further describe the purpose of the re-usable software component 104 and how the re-usable software component 104 is relevant to the business or higher purpose of a re-user.

In the implementation shown in FIG. 2, the knowledge elements 106 also include affinity metadata 204 that describes the other software components with which the re-usable software component 104 may be integrated. In this way, the affinity metadata 204 describes how the re-usable software component 104 has affinity, or composition value, to other software components published by the same or another publisher. The affinity metadata 204 may also identify a data entity that the re-usable software component 104 operates on or requires to be in memory. As discussed briefly above, the capabilities identified by the capability metadata 202 may be scoped to particular software components identified by the affinity metadata 204.

As shown in FIG. 2, the knowledge elements 106 may also include derivation metadata 206. The derivation metadata 206 indicates whether data entities specified by the affinity metadata 204 may be inherited or specialized from another data entity. The derivation metadata 206 may also indicate whether any of the identified data entities is an equivalent of, or replacement for, another externally described data entity. According to embodiments, the derivation metadata 206 further indicates whether a union operation or a merge operation is to be performed upon any of the data entities and an externally described data entity for any of the identified capabilities.

According to embodiments, the knowledge elements 106 further include transformation metadata 208. The transformation metadata 208 identifies the mechanisms for integrating the re-usable software component 104 with other software components. As discussed briefly above, for instance, the transformation metadata 208 may specify how the re-usable software component 104 is to be transformed to allow it to integrate with other software components, such as the application 102. For instance, the knowledge elements 106 may specify transformations for performing the merge and union operations with an externally described data entity as discussed above. As also discussed above, the transformations identified by the transformation metadata 208 may be scoped to capabilities of the re-usable software component 104 identified by the capability metadata 202.

According to other embodiments, the knowledge elements 106 also include re-user metadata 210. The re-user metadata 210 is metadata specified by a re-user for use with the re-usable software component 104 and is typically specified after the initial publication of the re-usable software component 104. For instance, in one implementation, a mechanism is provided that allows a re-user of the re-usable software component 104 to further specify the capability metadata 202, the affinity metadata 204, the derivation metadata 206, and the transformation metadata 208 originally published with the re-usable software component 104. In this way, a re-user can supplement or replace the metadata originally published with the re-usable software component 104 at a later time.

In another implementation, the re-user metadata 210 indicates whether the transformation metadata 208 was useful for an actual integration between the re-usable software component 104 and another software component. In this manner, a re-user of the re-usable software component can provide feedback within the knowledge elements 106 regarding the usefulness of the transformation metadata 208. Other re-users may utilize this data in determining whether to utilize the re-usable software component 104.

In yet another implementation, the re-user metadata 210 includes a popularity value for the re-usable software component 104. The popularity value indicates the popularity of the re-usable software component 104. Other re-users may also utilize the popularity value in determining whether to utilize the re-usable software component 104. It should be appreciated that a re-user of the re-usable software component 104 may also add other types of metadata to the re-user metadata 210 through an appropriate mechanism to provide feedback regarding the usefulness of the re-usable software component 104. Additional details regarding the use of the knowledge elements 106 for discovering and integrating the re-usable software component 104 will be provided below with respect to FIGS. 3 and 4.

Figure 3:
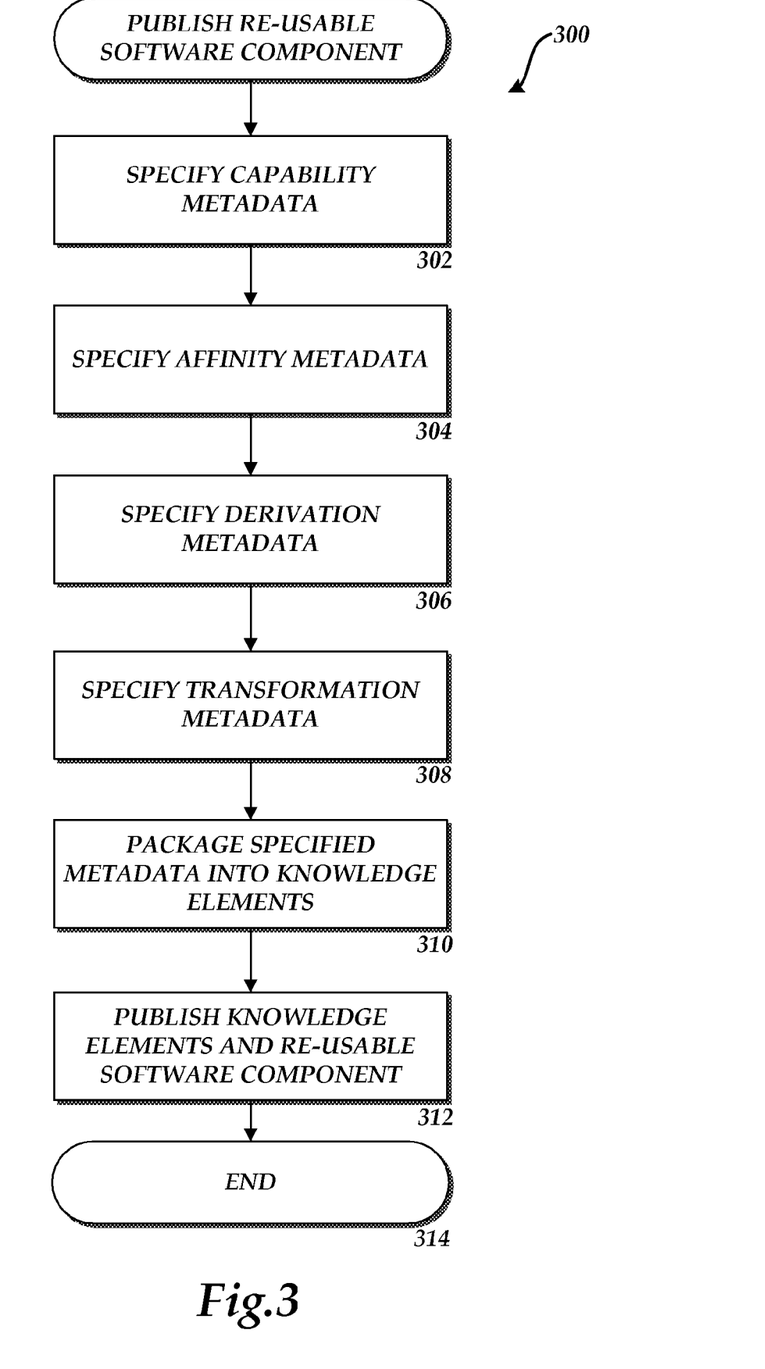
FIG. 3 is a flow diagram showing an illustrative process for publishing a re-usable software component in one embodiment presented herein.

Turning now to FIG. 3, additional details will be provided regarding the embodiments presented herein for re-using software components. In particular, FIG. 3 is a flow diagram illustrating one method for publishing the re-usable software component 104. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the capability metadata 202 is specified for the re-usable software component 104. From operation 302, the routine 300 proceeds to operation 304, where the affinity metadata 204 is specified for the re-usable software component 104. The routine 300 then continues to operation 306, where the derivation metadata 206 is specified. From operation 306, the routine 300 continues to operation 308, where the transformation metadata 308 is specified.

After the capability metadata 202, affinity metadata 204, derivation metadata 206, and transformation metadata 208 have been specified, they are packaged into the knowledge elements 106 in the manner described above with respect to FIG. 2. This occurs at operation 310. It should be appreciated that other data structures may be utilized to package the metadata.

Once the knowledge elements 106 have been completely assembled, the routine 300 continues to operation 312, where the re-usable software component 104 and the knowledge elements 106 are published. As discussed above, publication may entail storing the knowledge elements 106 and the re-usable software component 104 in a database or another location where they may be discovered and utilized by other software components and re-users. Additional details regarding one discovery and implementation process is provided below with respect to FIG. 4. From operation 312, the routine 300 continues to operation 314, where it ends.

Figure 4:
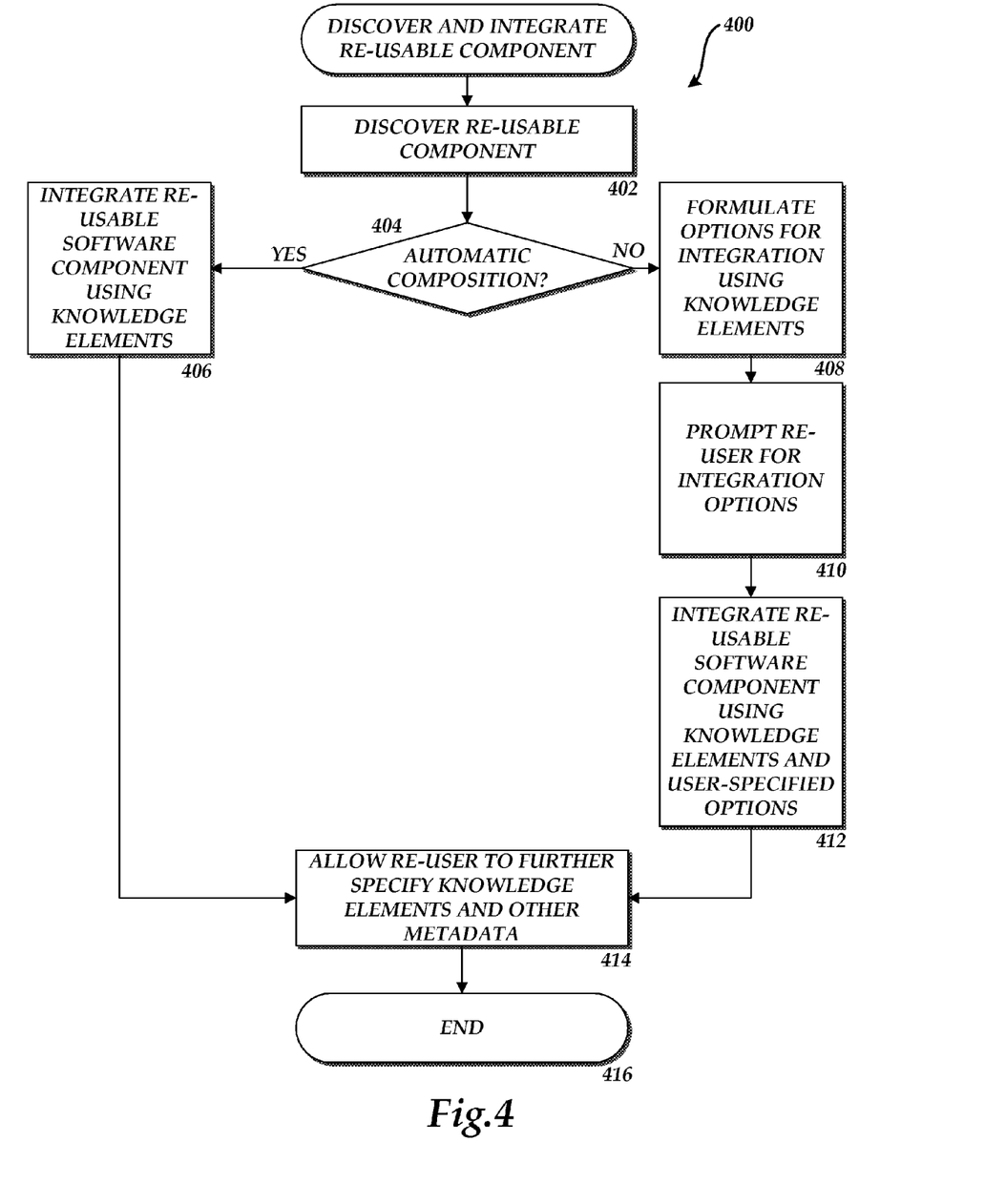
FIG. 4 is a flow diagram showing an illustrative process for discovering and integrating a re-usable software component in one embodiment presented herein.

Referring now to FIG. 4, an illustrative method for discovering and integrating the re-usable software component 104 will be described. The routine 400 begins at operation 402, where a discovery process is performed to locate the re-usable software component 104. As discussed above, in one implementation the re-usable software component 104 and the corresponding knowledge elements 106 are placed in a searchable location, such as a database. In order to discover an appropriate re-usable software component 104, a search is performed of the knowledge elements 106 to identify a suitable re-usable software component 104. For instance, according to implementations a search is made of the capability metadata 202 to identify a re-usable software component 104 with desired capabilities. A search may similarly be made of the affinity metadata 204 and the re-user metadata 210 to locate an appropriate re-usable software component 104 for a particular application.

Once an appropriate re-usable software component 104 has been discovered, the routine 400 continues to operation 404, where a determination is made as to whether the discovered re-usable software component is to be integrated (also referred to herein as "composited") in an automated fashion or whether a semi-automatic composition is to be performed utilizing input from a re-user of the re-usable software component 104. A fully automated composition does not require any involvement from the re-user. The determination as to whether a fully automated or semi-automatic composition is to be performed may be based upon a user preference, upon data contained in the knowledge elements 106, or upon other factors.

If a fully automated integration is to be performed, the routine 400 proceeds from operation 404 to operation 406. At operation 406, the re-usable software component 104 is integrated with another software component, such as the application 102 shown in FIG. 1, using the contents of the knowledge elements 106. In particular, the capability metadata 202, affinity metadata 204, derivation metadata 206, and the transformation metadata 208 are utilized to determine how the re-usable software component 104 and the other software component are to be integrated. For instance, the transformation metadata 208 may specify that certain transformation operations, such as union operations or merging operations, are to be performed upon the re-usable software component 104 in order to integrate the two software components. Other types of transformations may also be performed.

If, at operation 404, it is determined that a semi-automatic integration is to be performed, the routine 400 proceeds from operation 404 to operation 408. At operation 408, options are formulated for the integration using the contents of the knowledge elements 106. For instance, similar to the process performed at operation 406, the types of transformations and other operations to be performed may be identified. A re-user may then be prompted for additional integration options at operation 410. For instance, the user may be asked which type of transformations are to be performed when the transformation metadata 208 specifies that more than one type of transformation may be performed. Once the re-user has specified the integration options, the routine 400 proceeds from operation 410 to operation 412, where the re-usable software component 104 is integrated with the other software component using the contents of the knowledge elements 106 and the user-specified integration options.

From operations 406 and 412, the routine 400 proceeds to operation 414, where the re-user is permitted to further specify the metadata originally published in the knowledge elements 106. The re-user may also be permitted to add or edit the re-user metadata 210 described above with respect to FIG. 2. In one implementation, the re-user metadata 210 specified by a re-user may be automatically published for use by other re-users. Once this process has completed, the routine 400 proceeds to operation 416, where it ends.

Figure 5:
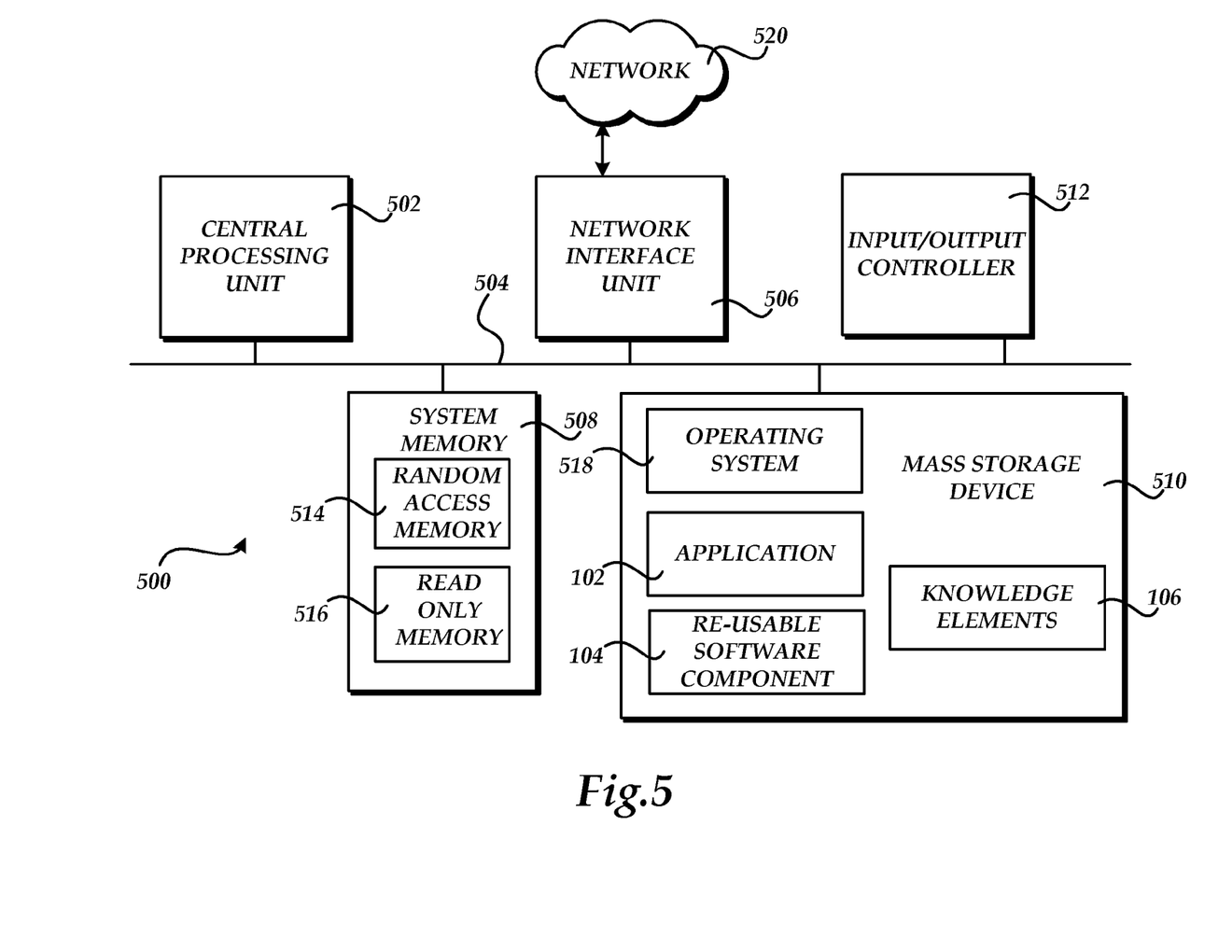
FIG. 5 is a computer architecture diagram showing an illustrative computer hardware architecture for a computing system capable of implementing aspects of the embodiments presented herein.

FIG. 5 shows an illustrative computer architecture for a computer 500 capable of executing the software components described herein for providing, discovering, and integrating a self-describing re-usable software component in the manner presented above. The computer architecture shown in FIG. 5 illustrates a conventional desktop, laptop, or server computer and may be utilized to execute any aspects of the software components presented herein. The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which have been described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the application 102, the re-usable software component 104, and the knowledge elements 106, each of which was described in detail above with respect to FIGS. 1-4. The mass storage device 510 and the RAM 514 may also store other types of program modules.

Based on the foregoing, it should be appreciated that technologies for providing, discovering, and integrating self-describing re-usable software components are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for re-using a software component, the method comprising:
publishing metadata for use in conjunction with a re-usable software component, the metadata
identifying one or more capabilities of the re-usable software component;
identifying one or more other software components with which the re-usable software component can be integrated; and
identifying one or more mechanisms for integrating the re-usable software component with the one or more other software components; and
integrating the re-usable software component and the one or more other software components based upon the metadata,
wherein the metadata identifying one or more mechanisms for integrating the re-usable software component with the one or more other software components comprises metadata identifying one or more transformations for integrating the re-usable software component with the one or more other software components.

2. The method of claim 1, wherein the metadata further identifies whether the one or more mechanisms for integrating the re-usable software component with the one or more other software components are scoped to one or more of the capabilities.

3. The method of claim 1, wherein the metadata further identifies whether the one or more capabilities of the re-usable software component are scoped to the one or more other software components with which the re-usable software component can be integrated.

4. The method of claim 1, further comprising:
receiving additional metadata from a user for use in conjunction with the re-usable software component, the additional metadata indicating whether the one or more mechanisms for integrating the re-usable software component with the one or more other software components were useful for an actual integration between the re-usable software component and the one or more other software components.

5. The method of claim 1, further comprising:
receiving additional metadata from a user for use in conjunction with the re-usable software component, the additional metadata identifying a popularity value for the re-usable software component.

6. A method for re-using a software component, the method comprising:
specifying capability metadata for a re-usable software component, the capability metadata defining one or more capabilities of the re-usable software component;
specifying affinity metadata for the re-usable software component, the affinity metadata identifying one or more data entities that the re-usable software component operates upon;
specifying derivation metadata for the re-usable software component, the derivation metadata indicating whether the one or more data entities specified by the affinity metadata may be inherited from another data entity;
specifying transformation metadata for the re-usable software component, the transformation metadata identifying one or more mechanisms for integrating the re-usable software component with one or more other software components; and
utilizing the capability metadata, the affinity metadata, the derivation metadata, and the transformation metadata to integrate the re-usable software component and the one or more other software components.

7. The method of claim 6, wherein the derivation metadata indicates whether the one or more data entities is the equivalent or replacement for another externally described data entity.

8. The method of claim 7, wherein the derivation metadata further indicates whether a union operation is to be performed upon the one or more data entities and an externally described data entity for one or more of the capabilities.

9. The method of claim 8, wherein the transformation metadata specifies one or more transformations for performing the union operation.

10. The method of claim 6, wherein the derivation metadata further indicates whether a merge operation is to be performed on the one or more data entities and an externally described data entity for one or more of the capabilities.

11. The method of claim 10, wherein the transformation metadata specifies one or more transformations for performing the merge operation.

12. The method of claim 6, further comprising providing a mechanism for a user of the re-usable software component to further specify the capability metadata, the affinity metadata, the derivation metadata, and the transformation metadata.

13. The method of claim 6, further comprising providing a mechanism for a user of the re-usable software component to specify additional metadata for use in conjunction with the re-usable software component, the additional metadata indicating whether the one or more mechanisms for integrating the re-usable software component with one or more other software components were useful for an actual integration between the re-usable software component and the one or more other software components.

14. The method of claim 6, further comprising providing a mechanism for a user of the re-usable software component to specify additional metadata for use in conjunction with the re-usable software component, the additional metadata identifying a popularity value for the re-usable software component.

15. A computer-readable medium not being a signal and having a data structure stored thereon, the data structure comprising:

a first data field storing capability metadata for a re-usable software component, the capability metadata defining one or more capabilities of the re-usable software component;

a second data field storing affinity metadata for the re-usable software component, the affinity metadata identifying one or more data entities that the re-usable software component operates upon;

a third data field storing derivation metadata for the re-usable software component, the derivation metadata indicating whether the one or more data entities specified by the affinity metadata may be inherited from another data entity; and a fourth data field storing transformation metadata for the re-usable software component, the transformation metadata identifying one or more mechanisms for integrating the re-usable software component with one or more other software components.

16. The computer-readable medium of claim 15, further comprising a fifth data field storing re-user metadata for the re-usable software component, the re-user metadata supplied by a user of the re-usable software component.

17. The computer-readable medium of claim 16, wherein the transformation metadata comprises data identifying one or more transformations for integrating the re-usable software component and the one or more other software components.

18. The computer-readable medium of claim 17, wherein the derivation metadata further indicates whether a merge operation is to be performed on the one or more data entities and an externally described data entity for one or more of the capabilities.

19. The computer-readable medium of claim 17, wherein the derivation metadata further indicates whether a union operation is to be performed upon the one or more data entities and an externally described data entity for one or more of the capabilities.

* * * * *